United States Patent [19] [11] 4,338,613
Cruz-Uribe [45] Jul. 6, 1982

[54] INK DROP DEFLECTOR

[75] Inventor: Antonio S. Cruz-Uribe, Cobalt, Conn.
[73] Assignee: Pitney Bowes Inc., Stamford, Conn.

[21] Appl. No.: 218,392
[22] Filed: Dec. 19, 1980
[51] Int. Cl.³ .......... G01D 15/18
[52] U.S. Cl. .......... 346/75
[58] Field of Search .......... 346/75, 140, 1.1

[56] References Cited

U.S. PATENT DOCUMENTS

| | | | |
|---|---|---|---|
| 3,369,252 | 2/1968 | Adams | 346/75 |
| 3,582,954 | 6/1971 | Skala | 346/140 PD X |
| 3,698,002 | 10/1972 | Appel | 346/1.1 |
| 3,871,004 | 3/1975 | Rittberg | 346/75 |
| 4,086,602 | 4/1978 | Yamada | 346/75 |
| 4,275,401 | 6/1981 | Burnett et al. | 346/75 |

*Primary Examiner*—Donald A. Griffin
*Attorney, Agent, or Firm*—Melvin J. Scolnick; William D. Soltow, Jr.; Albert W. Scribner

[57] ABSTRACT

An ink drop deflector is described for use with ink jet printing devices to deflect, as desired, electrically neutral ink drops ejected from an orifice in an ink jet printing device along a free flight trajectory. The ink drop deflector includes in one form a pair of differently sized electrodes which are positioned adjacent the trajectory near the orifice to create a non-uniform electric field with a sufficient potential gradient to deflect neutral ink drops with a relative low switching voltage. In another form of the invention, a plurality of electrodes are so placed adjacent an ink drop trajectory so as to cooperatively produce an electrostatic ink drop deflection force in a desired direction while cancelling force components in other directions. Several embodiments are illustrated including an array of ink drop deflectors.

11 Claims, 11 Drawing Figures

FIG. 3
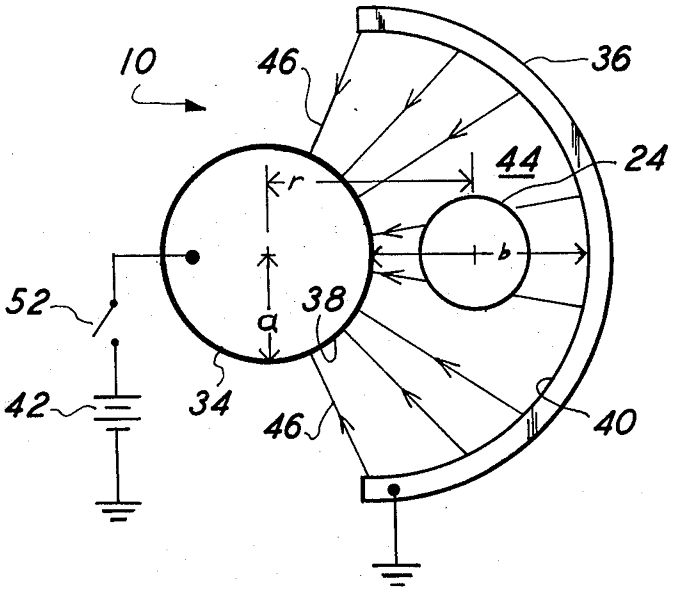
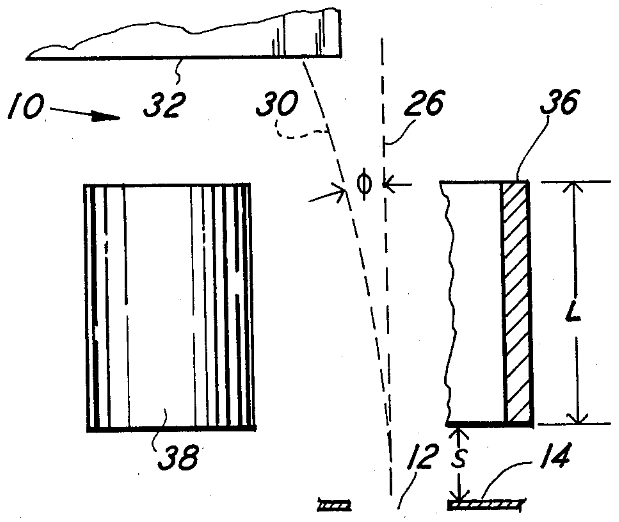
FIG. 2
FIG. 4
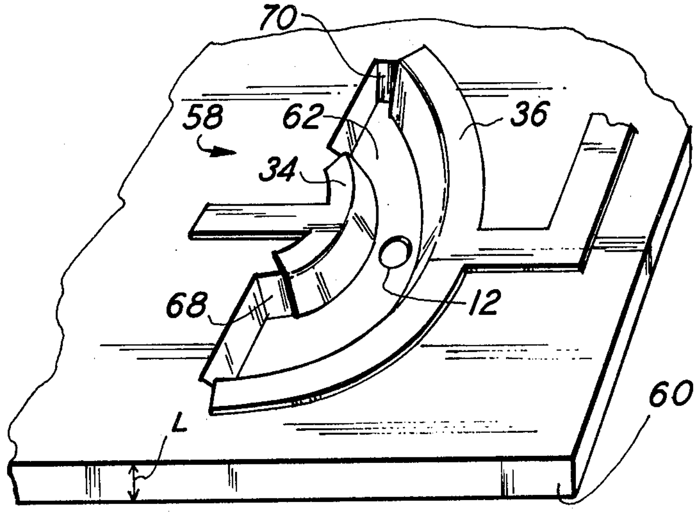

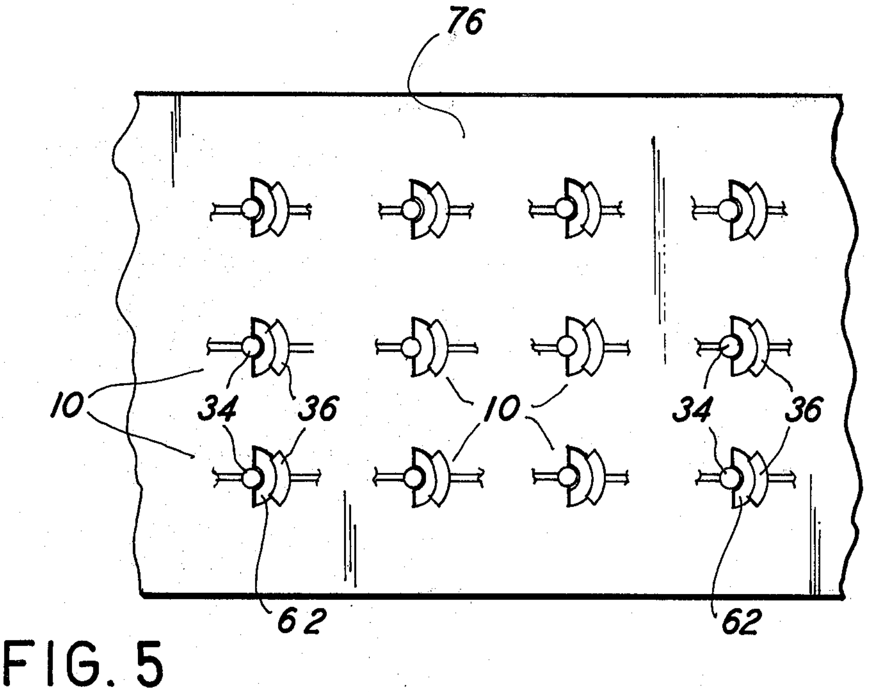
FIG. 5
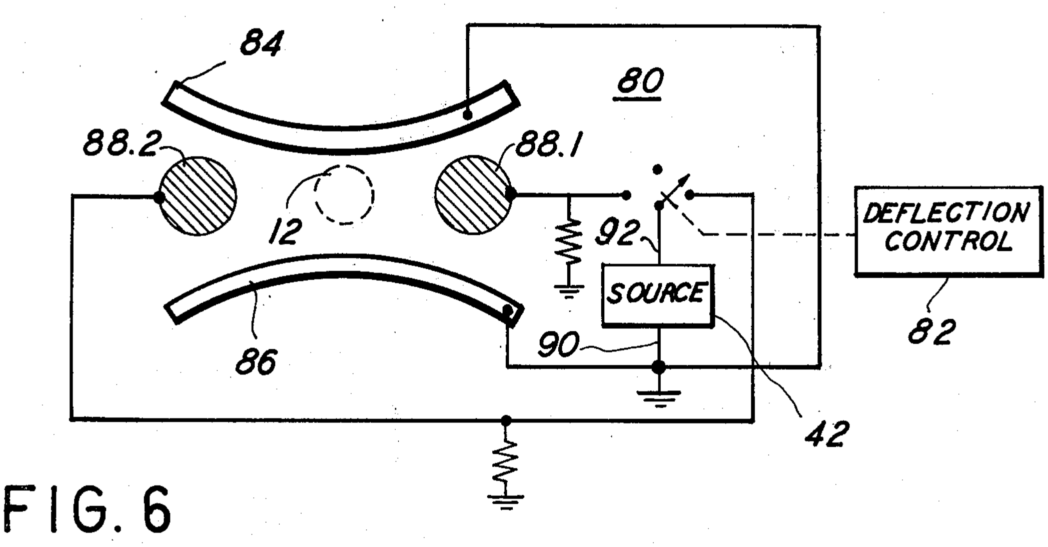
FIG. 6
FIG. 7
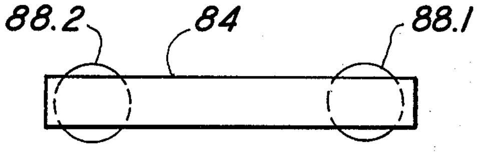

INK DROP DEFLECTOR

FIELD OF THE INVENTION

This invention relates to ink jet printing generally, and more specifically to a deflection apparatus for use with ink jet printing heads.

BACKGROUND OF THE INVENTION

Ink jet printing as it is known, provides a rapid and quiet method of printing with tiny drops of ink. The ink drops are ejected from orifices in an ink head which is closely spaced (commonly of the order of about 1 to about 2.5 mm for impulse ink jets, but longer distances for continuous ink jets) from the record medium on which characters or other information is to be printed. The characters are formed by small drops which, depending upon a variety of well known factors such as the ink and paper, result in varying degrees of printing quality.

An early article on ink jet printing is entitled "High Frequency Recording With Electrostatically Deflected Ink Jets" by R. G. Sweet and published in The Review of Scientific Instruments, Volume 36, No. 2, Pages 131-136, February 1965 and published by the American Institute of Physics. This article describes one type of ink jet printing, known as a continuous jet, in which a single or an array of orifices generate a continuous stream of drops at a relatively high speed (of the order of 20 m/sec) and a frequency of order of 100 KHz with different and higher frequencies being possible.

In order to print with the continuous ink jet, an electrostatic deflection technique is employed whereby the ink drops as they leave the nozzle or orifice have been given an electric charge. A deflection is then obtained by subjecting the charged drops to a uniform electric field.

The continuous ink jet enables very high speed printing, though often at the expense of quality in the printed character and requiring an elaborate control system. For example, when a high speed ink jet is used, care must be taken to avoid the electric charge of one drop affecting the trajectory of the adjacent drop. Furthermore, the continuous ink jet requires a high pressure ink supply, of the order of 50 lb/in$^2$ which demands more expensive feed lines and pressure regulation to maintain a proper feed of ink. The ink for a continuous ink jet must have a certain conductivity to be charged at the orifice. This limits the types of inks which can be used and thus the printing quality when a paper to be printed requires use of an ink which is not sufficiently conductive. Notwithstanding these difficulties, continuous ink jets have been successfully employed in high speed printers.

Another technique for ink jet printing is known as an impulse ink jet in which ink is supplied at a very low pressure, usually of the order of several inches of water, to a capillary tube ending at an orifice. An impulse generator such as a piezo-electric device is used to cause a pressure pulse through the capillary tube to the orifice and thus eject a drop of ink. Usually a print head will contain an array of orifices, each being supplied with ink through a capillary tube and having its own impulse generator. Electrical control over the impulse generators enables the formation of characters on a record medium. A description of an impulse jet printing head may, for instance, be found in an article entitled "Silent Ink Jet Printing For Printer Terminals" by J. Heinzl et al. and published in Siemens Review 44(9) pages 402-404, September 1977.

The impulse jet printing technique commonly involves printing with ink drops ejected at speeds of the order of 1-3 m/sec (about ten times slower than a continuous ink jet) and with a substantially lower drop frequency than with a continuous ink jet.

Although an impulse ink jet prints at a slower speed, it has advantages of a simpler control, a lower operating pressure and has a potential for producing quality printed characters. An improved control and drop consistency is obtained by operating the impulse ink jet continuously. In such case, however, a deflection control is required for the electrically neutral drops.

The U.S. Pat. No. 3,871,004 to Rittberg describes a technique for deflecting an array of electrically neutral ink drops by producing a potential gradient adjacent the orifices of an ink jet print head. The ejected electrically neutral ink drops are influenced by the potential gradient and are deflected towards the region of higher electric field intensity. With a deflection control as described in the Rittberg patent, control over individual drops is not provided and the described structure does not lend itself readily to cleaning of the orifices and adjacent ink head surfaces.

SUMMARY OF THE INVENTION

With an ink jet deflection control in accordance with the invention, deflection of individual electrically neutral drops from a single orifice or from an array of orifices can be controlled. This is obtained as described with reference to one form of the invention with a pair of electrodes, each of which has an electric field producing surface but of different surface areas. The electrodes are located adjacent the orifice so that when an electric potential is applied, a non-uniform electric field is generated whose potential gradient is sufficient to deflect the electrically neutral ink drops.

As further described herein, the electrodes may be spaced at opposite sides of an orifice to enhance the electric field gradient across the trajectory of ink drops ejected from an orifice. Sufficient ink drop deflection is obtained to steer an individual drop away from the normal trajectory, such as to a drop collector, even with substantial drop speeds and drop rates. The electrodes furthermore are so spaced from the ink head surface to facilitate its cleaning while also preventing ink wetting of the electrodes.

The electrodes as described in one form of the invention have a thickness along the trajectory so as to enable to deflect a single drop without affecting drops in front or those being formed behind. The electrodes further can be made sufficiently small so that they can be used with an array of orifices.

In another form of the invention a deflection control for an ink jet is formed by employing a set of a plurality of electrodes adjacent an orifice in such manner that several distinct potential gradients are produced, each gradient cooperating with the other to produce a deflection force in a desired direction on the electrically neutral drops. With one set of electrodes, the several electric field gradients are produced with electrodes of different surface areas. With another set of electrodes the several field gradients are formed by spaced electrode pairs which are located to one common side of an orifice.

With an ink jet deflection control in accordance with the invention, simplified controls can be employed on a printing head and relatively low deflection voltages can be used so that available economic semiconductor switching devices can be used. When a deflection control in accordance with the invention is used with an impulse ink jet, its maximum continuous operating speed can be used while still providing quality printed characters.

It is, therefore, an object of the invention to provide an effective deflection control for electrically neutral ink drops ejected from an ink head such as an impulse or continuous ink jet. It is a further object of the invention to provide control for electrically neutral ink drops ejected from an ink head while maintaining the ink head easy to clean and reduce ink wetting of the deflection control.

These and other objects and advantages of the invention can be understood from the following description of several embodiments described in conjunction with the drawings.

BRIEF DESCRIPTION OF DRAWINGS

FIG. 2 is a greatly enlarged top plan view of the ink drop deflection apparatus in accordance with the invention;

FIG. 3 is a side and schematic view of the ink drop deflection apparatus shown in FIG. 2 and taken along the trajectory of ink drops as they are ejected from an ink head orifice;

FIG. 4 is a partial perspective view of an ink drop deflector plate in accordance with the invention;

FIG. 5 is a greatly enlarged partial plan view of an array of deflection devices in accordance with the invention;

FIG. 6 is a side and schematic view of another form for an ink drop deflection apparatus in accordance with the invention;

FIG. 7 is a top plan view of the ink drop deflection apparatus shown in FIG. 5;

DETAILED DESCRIPTION OF EMBODIMENTS

Figure 1:
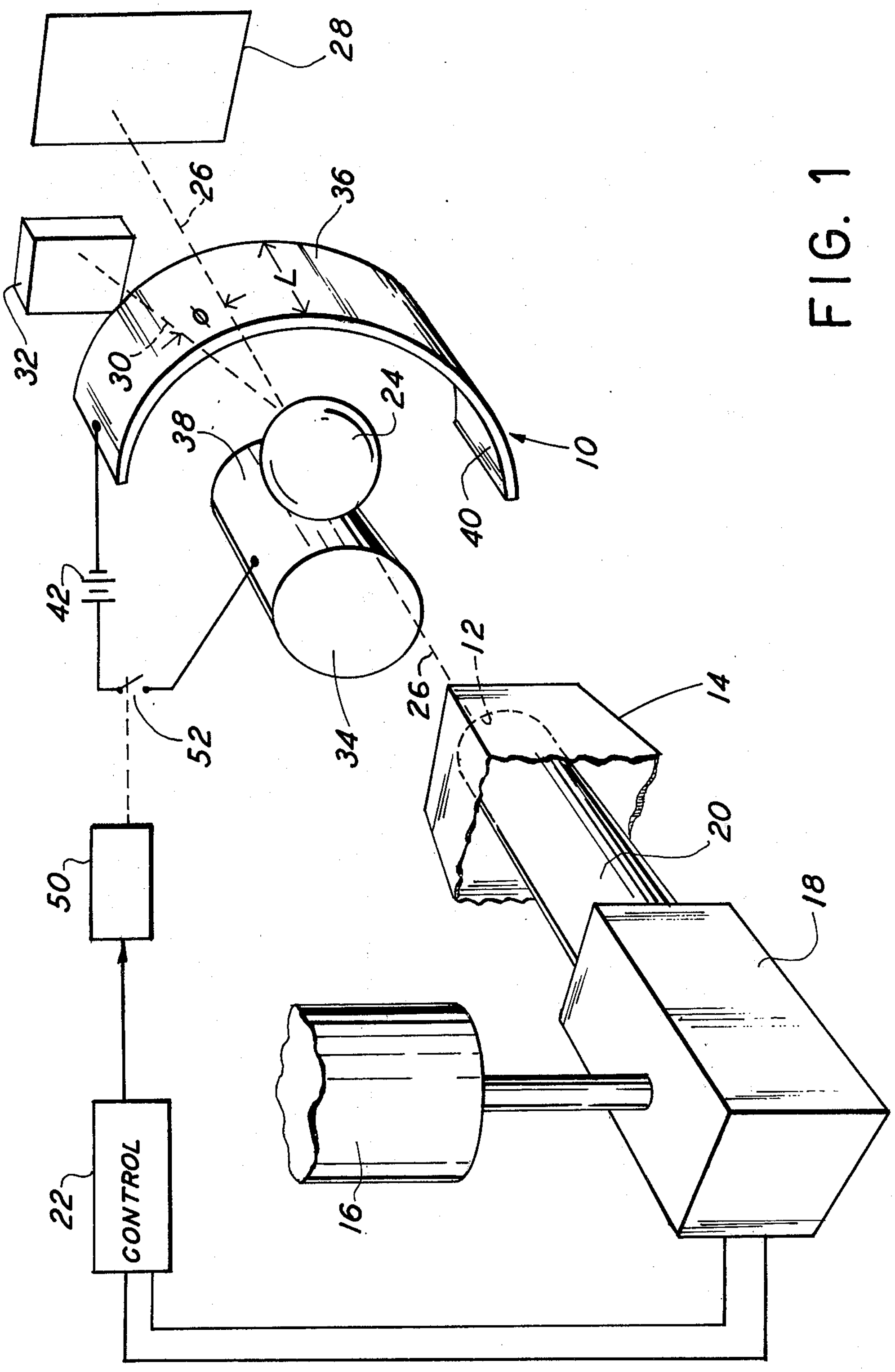
FIG. 1 is a greatly enlarged perspective partially schematic and block diagram view of an ink drop deflection apparatus in accordance with the invention.

With reference to FIGS. 1, 2 and 3, an ink drop deflector 10 is shown disposed adjacent an orifice 12 of an ink head 14. The ink head 14 is, for purposes of illustration, shown with a single orifice, though the invention can be employed with an ink head in which an array of orifices 12 are employed. The ink head 14 may be for a continuous ink jet, though in the embodiment described, an impulse ink jet head is used.

The impulse ink jet head 14 is provided with suitable ink from a reservoir 16 and thence past an impulse generator 18 and through a capillary tube 20 to orifice 12. An electronic control 22 provides impulse generator 18 with a drive signal to cause the ejection of an ink drop 24 which ordinarily would, in free flight, follow a trajectory 26 to a recording medium 28 such as paper. The reservoir 16, impulse generator 18, ink head 14 and control 22 are well known devices and need not be further described.

The ink jet head 14 may produce electrically neutral ink drops such as 24 at a relatively high speed and rate and it is desired to be able to deflect an individual ink drop 24.

In the embodiment of FIG. 1 the ink drop 24 is to be deflected along a deflection path 30 to a collector or gutter 32 which may be a metal plate or ink absorbing material. This deflection may be reversed whereby the collector 32 is placed along trajectory 26 and the paper is along the deflection path 30. Also, the deflection path may be directed at some area on the paper alongside the impact point of the trajectory 26.

The deflector 10 is formed of a pair of electrodes 34, 36 on opposite sides of orifice 12 and are slightly spaced therefrom along trajectory 26 with spacers (not shown). The electrodes 34, 36 have electric field producing surfaces 38, 40 respectively. Surfaces 38, 40 are differently sized with the area of surface 38 being smaller than the area for surface 40.

Hence, when an electric potential V, from a source 42, is applied across electrodes 34, 36, an electric field 44 is created between those portions of the electrode surfaces which face each other as suggested by the arrowed lines 46 in FIG. 3. The smaller electric field producing surface 38 causes the field lines 46 to converge, thus increasing the field intensity near electrode 38. The electric field 44 thus is not uniform and has a potential gradient.

When an electrically neutral ink drop 24 is ejected from orifice 12 and passes between surfaces 38, 40 while the voltage source 42 is applied, the ink drop 24 becomes electrically polarized. As a result, an electrostatic attraction force is exerted by the region where the electric field intensity increases, so that the ink drop 24 is deflected towards the electrode 34 having the smaller electric field producing surface 38. As a result the ink drop 24 is deflected along a path such as 30.

Control over the excitation of electrodes 34, 36 is obtained with an electronic logic circuit 50 activated by control 22 and controlling a semiconductor switch 52 in series with voltage source 42.

In FIGS. 1-3 the electrodes 34, 36 are shown greatly enlarged for clarity. In a practical printing application, however, the orifice 12 and adjacent electrodes 34, 36 are quite small; thus enabling use of a relatively low electrical potential between the electrodes while still producing a useful deflection.

The magnitude of the deflection angle $\phi$ is a function of voltage V of potential 42, the spacing b or gap between electrodes 34, 36 and the ejection velocity S of the ink drop 24. These factors can be related by the following relationship using cylindrically curved electrodes 34, 36:

$$\tan\phi = \frac{3}{4\pi}\left[\frac{e-1}{e+2}\right]\frac{V^2}{\ln(b/a)^2}\cdot\frac{L}{r^3}\cdot\frac{1}{p\,S^2}\ \text{(in CGS units)}$$

where e = dielectric constant for the ink drop 24

V = voltage of source 42

L = length of electrodes 34, 36 along trajectory 26 p = density of ink drop 24

S = ejection velocity of ink drop 24 b=gap between the electric field producing surfaces 38, 40 a=radius of a cylindrically shaped smaller electrode 34 r=distance from the center of the trajectory 26 to the center of the smaller electrode 34.

In a practical application, the ink drop 24 may have a diameter of 0.05 mm, the electrode 34 with the smaller electric field producing surface may have a radius, a, of 0.05 mm, the gap b can be about 0.12 mm, with the distance r being about 0.11 mm and the length L in the range from about 0.5 to about 2 mm. The length L preferably is made sufficiently short so that only one ink drop is exposed to the deflection field at any one time. The radius of curvature for the larger electrode 36 may be about 0.1 mm. With these dimensions and a velocity S in the range from about 1.0 to 3.0 m/sec, a relatively low electrode voltage V of less than 500 volts can be used to achieve a satisfactory ink drop deflection. In this range for voltage V a conventional transistor switch 52 can be used. Care must be taken to avoid excessively high deflection forces on an ink drop 24 lest the unequal but opposing deflection forces overcome its surface tension and cause the drop to split.

Placement of an ink drop deflector 10 such as using electrodes 34, 36 relative to orifice 12 and the trajectory 26 is critical in the sense that small variations tend to affect the deflection characteristics. Preferably the ink drop deflector is so located that the ink drops 24 pass closer to the smaller surface electrode 34 than electrode 36. The ink drop deflector of FIGS. 1–3 is shown using cylindrical geometry and the foregoing relationship was so determined. However, the electrode shape may be varied without appreciably changing the effectiveness of the deflector and, in fact, improving it. For example, instead of a cylindrically shaped electrode 34, it may be flat.

Well known semiconductor processes can be used to accurately form the electrodes on an apertured substrate. For example, as shown in FIG. 4 an ink drop deflector 58 on a plate 60 of thickness L formed. An aperture 62 having a shape as shown may be produced by using an etching technique. Electrodes 34, 36 and a connected conductor can then be deposited or otherwise formed on surfaces 68, 70 bounding aperture 62 and are connected to a circuit as shown in FIG. 1.

The electrode plate 60 is mounted to ink head 14 with aperture 62 being carefully aligned with orifice 12. Plate 60 is slightly spaced from the orifice 12 to avoid contact with any ink surrounding orifice 12 on the ink head. The spacing S (see FIG. 2) between the ink head surface 14 and the ink drop deflectors such as 10 or 58, is particularly useful in facilitating cleaning of orifices 12 and surface 14. Furthermore, the spacing S tends to prevent ink wetting of the ink drop deflectors. The spacing S need not be large, but should be sufficient to prevent ink wetted onto surface 14 from contacting any of the electrodes in an ink drop deflector. In an impulse ink jet a spacing S of the order of about 0.25 mm is sufficient.

The technique for producing electrode plate 60 may be expanded to include an array of deflectors 10 for use in front of a corresponding array of orifices 12 in an ink head 14. FIG. 5 shows such an array 76 with ink drop deflectors 10 being spaced at intervals of the order of about 0.5 mm in correspondence with the spatial distribution of orifices 12 in an ink head 14. Electrical connection to the electrodes used in array 76 is made with suitable conductors formed on the deflector plate 76.

FIGS. 6 and 7 show an alternate ink drop deflector 80 for deflection of a single drop in several directions depending upon signals from a deflection control 82. A pair of deflector electrodes 84, 86 is shown spaced on opposite sides of an orifice 12. Electrodes 84, 86 are like shaped and curved to arch away from third electrodes 88.1, 88.2 having smaller electric field producing surfaces.

Electrodes 84, 86 are electrically connected together and to a terminal 90 of potential source 42. The latter has its other terminal 92 connected through a three position single pole switch 94 to either electrode 88.1 or 88.2 or neither. Switch 94 is illustrated for clarity as a mechanical switch, though an electronic equivalent is preferably employed. Switch 94 is actuated by deflection control 82.

With an ink drop deflector 80, the larger surface electrodes 84, 86 each produce a deflection force on an ink drop, but the effect of these forces cooperate to deflect an ink drop to a common side, i.e. towards either electrode 88.1 or 88.2, while cancelling deflection force components in other directions.

The electrodes 84, 86 may in some cases be flat plates with the actual shape and configuration of the electrodes selected to obtain a sufficient deflection force at reasonable voltage levels and without splitting ink drops.

Figure 8:
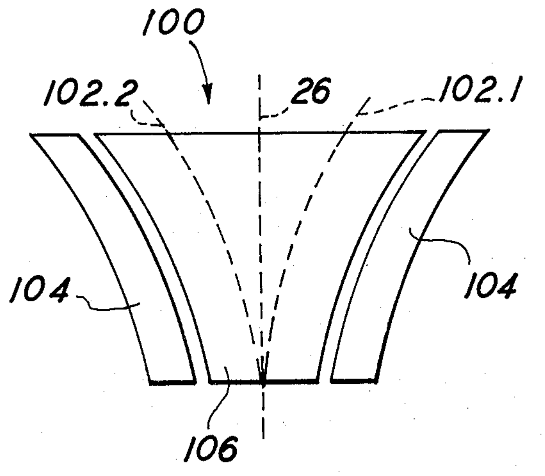
FIG. 8 is a top plan view of another ink drop deflection apparatus in accordance with the invention.

In FIG. 8 an ink drop deflector 100 is shown employing an extended length along the trajectory 26. The deflector 100 is similar to the deflector 80 of FIG. 6 except that ink drop deflector 100 is intended to cause an ink drop to follow a curved trajectory, such as 102.1 or 102.2 at a constant distance from a smaller surface area electrode 104. The pair of large surface area electrodes 106 (only one being visible in the view of FIG. 8) and either one of the small surface area electrodes 104 cooperate to provide the desired deflection. The curvature of the smaller electrodes 104 is selected to parallel the deflected trajectory 102.

Figure 9:
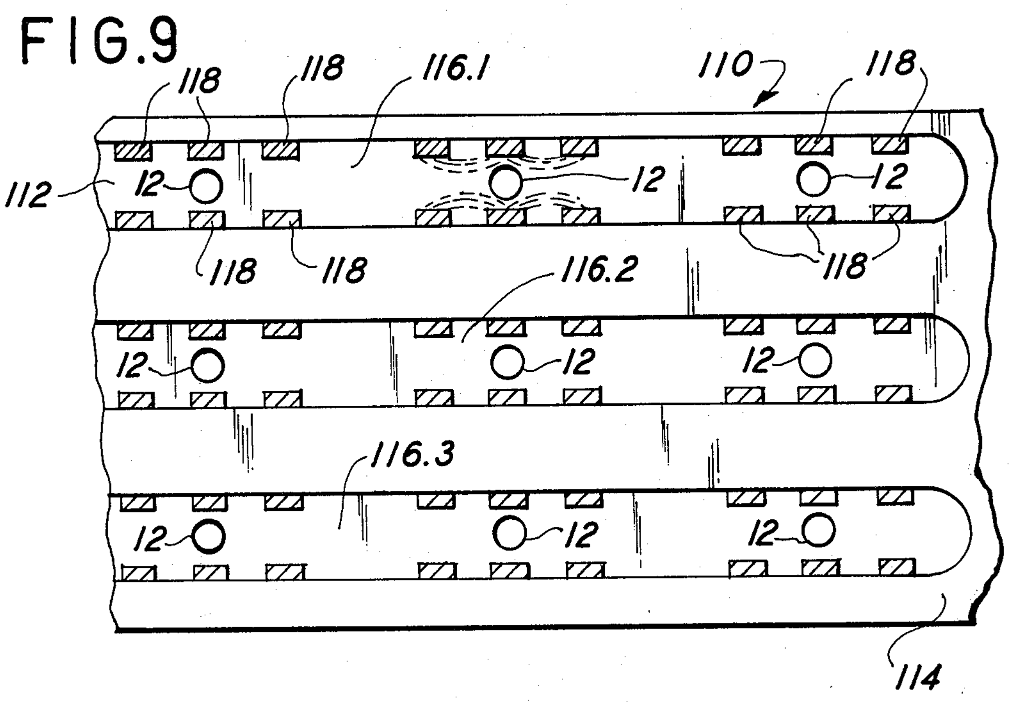
FIG. 9 is a side view of another ink drop deflection apparatus in accordance with the invention.

FIG. 9 illustrates an embodiment in which a simplified array 110 of ink drop deflectors 112 is formed on a flat substrate 114. The substrate 114 has a plurality of slots 116 along which like sized electrodes 118 are symmetrically arranged in pairs with respect to orifices 12 visible through the slots 116. Each orifice is operatively spaced with respect to three pairs of electrodes 118, though in some cases two pairs will suffice.

Figure 10:
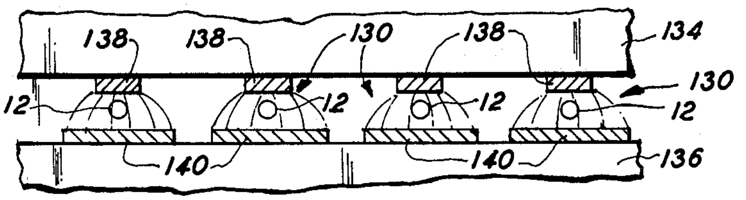
FIG. 10 is a side view of another ink drop deflection apparatus in accordance with the invention.

FIG. 10 shows an array of ink drop deflectors 130 formed with a pair of substrate plates 134, 136 on which flat, differently sized electrodes 138, 140 are formed. The electrodes 138, 140 may be deposited using techniques as are well known in the semiconductor manufacturing field. The substrates 134, 136 are separately formed and so spaced from orifices 12 as to locate orifices 12 between electrode pairs 138, 140. The differently sized electrodes 138, 140 generate the desired electric field gradient to deflect ink drops as previously described. The electrodes 140 may be separately energized.

Figure 11:
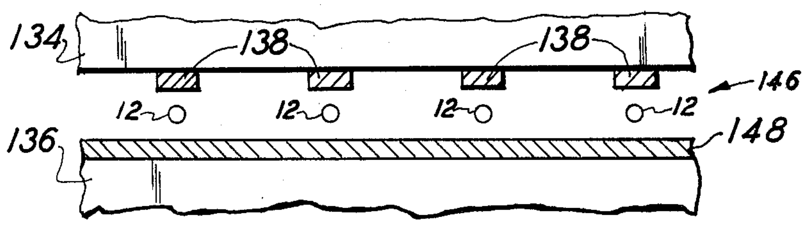
FIG. 11 is a side view of another ink drop deflection apparatus in accordance with the invention.

In FIG. 11 an array of ink drop deflectors 146 is shown similar to that of FIG. 10, but wherein a single large electrode 148 is used opposite small electrodes 138 with the orifices 12 in between the electrodes. In both embodiments of FIGS. 10 and 11, neutral ink drops ejected from orifices 12 may be deflected towards the smaller electrodes 138 upon electric energization. The large electrode 148 may be deposited on a substrate 136 as shown in FIG. 11 or be formed of a single conductive material.

Having thus explained several ink drop deflector embodiments in accordance with the invention, its advantages can be appreciated. Variations from the disclosed embodiments can be made without departing from the scope of the invention.

What is claimed is:

1. An apparatus for deflecting electrically neutral ink drops ejected from an orifice in an ink head to travel in free flight towards a record medium along a predetermined trajectory orifice comprising:

means for producing a non-uniform electric field with a potential gradient oriented along a desired deflection direction with respect to said trajectory, said means including:

a first electrode having a cylindrically shaped first electric field producing surface;

a second electrode having a cylindrically shaped second electric field producing surface facing the first electrode and being located generally equidistant from the first electric field producing surface;

said first electric field producing surface having a surface area which is smaller than the surface area of said second electric field producing surface to produce said potential gradient, whereby said electrically neutral drops are deflected towards said first electrode when said electrodes are electrically energized.

2. An apparatus as set forth in claim 1 wherein said first and second electrodes are spaced a predetermined distance from the ink head along the direction of travel of the ink drops.

3. An apparatus as set forth in claim 1 wherein said first and second electrodes are located at respectively opposite sides of said trajectory near said orifice.

4. An apparatus as set forth in claim 1 wherein first and second electrodes are so located that said first electric field producing surface is more closely located to said trajectory than said second electric field producing surface.

5. An apparatus as set forth in claim 1 wherein said first and second electrodes extend along said trajectory for a distance generally less than the spacing between successively ejected ink drops.

6. An apparatus for deflecting electrically neutral ink drops ejected from an orifice in an ink head to travel in free flight towards a record medium along a predetermined trajectory comprising:

first means for producing a non-uniform electric field having a first potential gradient on one side of the orifice and located adjacent thereto to produce a deflection force on said neutral ink drops in a first direction;

second means for producing a non-uniform electric field having a second potential gradient on said one side of the orifice and located adjacent thereto to produce a deflection force on said neutral drops in a second direction;

said first and second means being so located relative to said orifice so as to cooperatively produce a deflection force in a desired direction on said electrically neutral ink drops and being partially symmetrically spaced relative to said trajectory to produce said cooperating deflection force in the desired direction while effectively cancelling force components acting on an ink drop in other directions.

7. An apparatus as set forth in claim 1 wherein said first and second means each include:

a pair of first and second electrodes which are spaced to produce a potential gradient adjacent the trajectory and near the orifice, with said second electrode being further spaced from the trajectory than said first electrode;

with a pair of said first and second electrodes being located on opposite sides of the trajectory.

8. An apparatus for deflecting electrically neutral ink drops ejected from an orifice in an ink head to travel in free flight towards a record medium along a predetermined trajectory comprising:

a first electrode having a first electric field producing surface and a second electrode having a second electric field producing surface whose surface area is larger than said surface area of said first electrode, said first and second electrodes producing a non-uniform electric field having a first potential gradient on one side of the orifice and located adjacent thereto to produce a deflection force on said neutral ink drops in a first direction;

a third electrode having a symmetrical location relative to the trajectory and with respect to said second electrode, said third electrode generating a potential gradient with said first electrode and producing a non-uniform electric field having a second potention gradient on said one side of the orifice and located adjacent thereto to produce a deflection force on said neutral drops in a second direction;

said first, second, and third electrodes being so located relative to said orifice so as to cooperatively produce a deflection force in a desired direction on said electrically neutral ink drops.

9. An apparatus as set forth in claim 8 wherein said second and third electrodes are like shaped.

10. An apparatus as set forth in claim 8 wherein said second and third electrodes are electrically connected to have the same electrical potential.

11. An apparatus as set forth in claim 8 wherein said second and third electrodes are arched with ends thereof being arched away from said first electrode.

* * * * *